Aug. 22, 1961 D. W. LEWIS 2,997,458
EPOXY-SUBSTITUTED ORGANOSILICONE COMPOUNDS
Filed Oct. 3, 1958
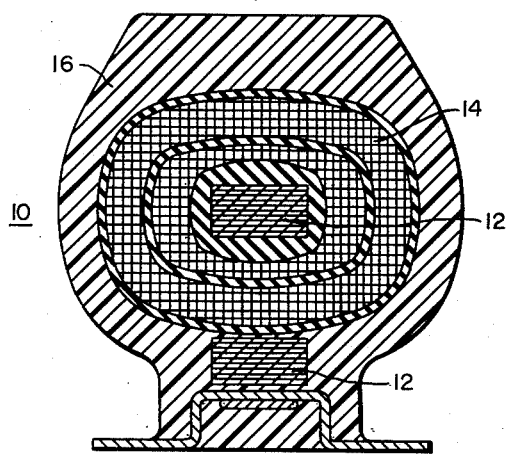
WITNESSES
INVENTOR
Daniel W. Lewis
BY
ATTORNEY

United States Patent Office 2,997,458
Patented Aug. 22, 1961

2,997,458
EPOXY-SUBSTITUTED ORGANOSILICONE COMPOUNDS
Daniel W. Lewis, Penn Hills, Pa., assignor to Westinghouse Electric Corporation, East Pittsburgh, Pa., a corporation of Pennsylvania
Filed Oct. 3, 1958, Ser. No. 765,122
1 Claim. (Cl. 260—46.5)

The present invention relates to organosilicone compounds and has particular reference to a new class of compounds comprising epoxy-substituted organosilicone compounds, to their preparation, and to their conversion to useful polymeric products.

Organosilicone compounds are used quite extensively in the electrical industry, particularly as insulating materials for various types of electrical apparatus and equipment. The use of such compounds as insulating materials is desirable due to their high thermal stability characteristics.

Epoxy resins, also known as glycidyl polyethers, also are used as insulating materials in the electrical industry, primarily because of their excellent chemical resistant characteristics, their excellent adhesive properties, and their low polymerization shrinkage characteristics.

While organosilicone compounds containing organic groups having epoxy rings have been prepared before, in such compounds the organic groups containing epoxy rings have been attached to the silicon through an oxygen atom, i.e. to form a Si-O-C linkage, and as such are subject to rupture and loss through hydrolysis at this Si-O-C linkage.

An object of the present invention is to provide epoxy-substituted organosilicone compounds in which an organic group containing an epoxy ring is attached directly to a silicon atom through a C-Si bond which compounds do not undergo hydrolysis as do prior art compounds.

A further object of the present invention is to provide a process for preparing epoxy-substituted organosilicone compounds in which organic groups containing epoxy rings are attached directly to silicon atoms by C-Si bonds.

Another object of the present invention is to provide an electrical member comprising an electrical conductor insulated with the epoxy-substituted organosilicone compounds described above.

Other and further objects of the invention will, in part, be obvious and will, in part, appear hereinafter.

In accordance with the present invention and in the attainment of the foregoing objects, there is provided an organosilicone compound having a structural formula selected from the group consisting of:

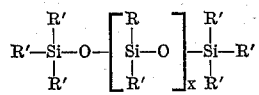

and

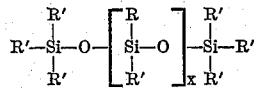

in which R is an aliphatic group containing an epoxy group, R' is an aliphatic or aromatic group, and $x$ varies from 0 to 50. In particular, R represents a

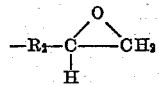

radical, wherein $R_2$ is a bivalent hydrocarbon radical having at least one carbon atom, thus $R_2$ may be methylene, ethylene, propylene, octylene, and dodecylene.

In accordance with still another aspect of this invention, there is provided an electrical member comprising an electrical conductor having electrical insulation disposed thereon, said insulation comprising the solid product obtained by heat-hardening the viscous organopolysiloxanes herein described.

In accordance with another aspect of this invention, there is provided a process for preparing an epoxy-substituted organosilicone compound comprising admixing and reacting 1 mol of an organosiloxane with from 1 to 2 mols of a dialkali metal salt and an excess of an epihalohydrin.

For a better understanding of the nature and objects of the invention, reference should be had to the following detailed description and drawing, the single figure of which is a front view, in cross section, of a transformer insulated with the epoxy-organosilicone polymer of this invention.

In preparing the epoxy-substituted organosilicone compounds of this invention, in accordance with a preferred method, one mol of an organosiloxane is admixed and reacted with from 1 to 2 mols of a dialkali metal salt in a suitable solvent therefor, for example, methyl Carbitol. The admixing and reacting is carried out at a temperature in the range of 175° C. to 200° C. The reaction is allowed to continue at this temperature until substantially no more salt precipitate will form when silver nitrate is added to sample portions of the reaction product. The reaction product is then allowed to cool to approximately 70°–90° C. and at least 2 mols of an epihalohydrin are added. Generally, no more than 4 mols of epihalohydrin need be added to insure obtaining a product having the maximum ratio of one epoxy ring per silicon atom. The resultant mixture then is agitated for from 8 to 12 hours at from 70° to 140° C. Preferably, the mixture is heated for about 6 hours at approximately 80° C., after which the temperature of the mixture is raised to and maintained at approximately 130° C. for approximately 4 hours. The reaction product is then filtered, and the filtrate freed of the methyl Carbitol, or other solvent introduced with the dialkali metal salt, by distillation. The resultant product is an epoxy-substituted organosiloxane having a structure within the formulae set forth above, and having a viscosity in the range of from 100 to 5000 centistokes at 25° C.

Organosiloxanes suitable for use in accordance with this invention may be selected from the group consisting of straight, cyclic, and branched chain organosiloxanes, having at least two silicon atoms with at least one carbon atom attached to each silicon atom and one reactive halogen attached to at least one of the carbon atoms. While the halogen may be fluorine, it is preferred to use chlorine, bromine, or iodine. Examples of suitable organosiloxanes which may be used in accordance with this invention include:

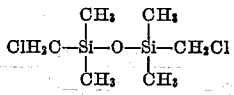

Bis(chloromethyl)tetramethyldisiloxane

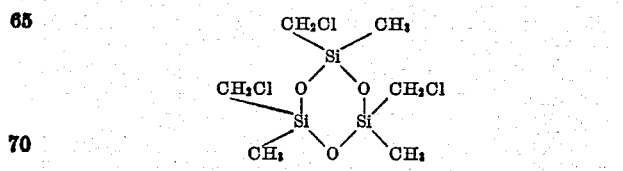

1,2,3-trimethyl-1,2,3-tris(chloromethyl)cyclotrisiloxane

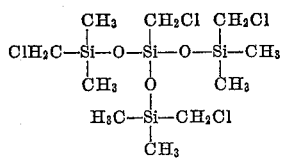

1,1,5,5-tetramethyl 1,3,5-tris(chloromethyl)-3-(chloromethyl) dimethylsiloxysiloxane A dialkali metal salt suitable for use in accordance with this invention is any dialkali metal salt of a compound containing at least two phenolic groups. Examples of suitable compounds include the disodium salt of bis-phenol "A," 4,4'-dihydroxy-diphenol, 3,3'-dihydroxy-diphenol, 2,2'-dihydroxy-diphenol, the di-potassium salt of bis-phenol "A," and the like. These salts may be used singly or in mixtures of two or more.

In accordance with the teaching of this invention, any epihalohydrin may be utilized, for example, halohydrins of chlorine, bromine, fluorine and iodine, for instance, epichlorohydrin, epibromohydrin, epiiodihydrin and epifluorohydrin.

Catalysts which may be used to facilitate the curing of the viscous epoxy-substituted organosilicone compounds of this invention include those which are suitable for curing epoxy resins, for example, amine catalysts such as ethylene diamine, diethylene triamine, triethylene tetramine, tetraethylene pentamine and the like. The catalyst may be employed in quantities ranging from 1% to 10% by weight based on the weight of resin to be cured.

The organsilicone compounds thus prepared have a maximum of one epoxy ring per silicon atom. This insures the provision of a finished compound having maximum thermal stability characteristics as well as maximum adhesive properties.

The catalyzed epoxy-substituted organosilicone resins of this invention may be cured by heating at a temperature in the range of 100° C. to 150° C. for a period of time in the range of 1 hour to 24 hours.

The following is a specific example of one convenient method for preparing an epoxy-substituted organosilicone compound utilizing the process described above.

*Example I*

One mole of bis(chloromethyl) tetramethyldisiloxane was added with stirring to a suspension of two mols of disodium salt of bis-phenol "A" in methyl Carbitol at 190° C. Sodium chloride was formed. The mixture was allowed to cool to 80° C. Excess epichlorohydrin (approximately 4 mols) was added and the mixture was stirred and heated at a temperature of 80° C. for approximately six hours. The temperature of the reaction was then raised to 130° C. and maintained there for approximately four hours during which time a precipitate formed. The precipitate was filtered off and washed with benzene. The filtrate was freed of methyl Carbitol by distillation at 0.08 millimeters Hg, and found to have an epoxy number of 925.

The resultant filtrate product had a general structural formula of:

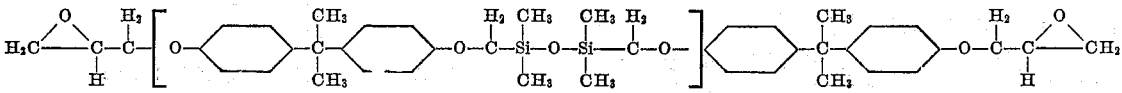

Equally satisfactory epoxy containing corresponding siloxanes are achieved by substituting 1 mol of 1,2,3-trimethyl-1,2,3-tris(chloromethyl) cyclotrisiloxane or 1 mol of 1,1,5,5,-tetramethyl-1,3,5,-tris (chloromethyl)-3-(chloromethyl)dimethylsiloxane for the 1 mol of bis (chloromethyl) tetramethyldisiloxane of Example I.

By substituting 1 mol of disodium salt of bis-phenol "A" for the 2 mols of disodium salt of bis-phenol "A" used in Example I, there is produced a siloxane having only one terminal epoxy group attached to the silicon atoms instead of two as in (A) of Example I.

Satisfactory results also are obtained by following the procedure of Example I utilizing 2 mols of epichlorohydrin in place of the excess, namely 4 mols, called for in Example I.

The epoxy-substituted organosilicon compounds of this invention may be prepared in accordance with still another process.

In accordance with this second process, equal molar amounts of an organosiloxane having at least one hydrocarbon group with at least one unsaturated aliphatic group therein and a peracid or a peroxide are reacted at a temperature in the range of from −20° C. to +20° C. The reaction is allowed to continue until all the peracid or peroxide has reacted to form an epoxy group on the multi-carbon atom hydrocarbon groups.

The organsiloxane suitable for use in accordance with this latter process may be one selected from the group comprising straight, cyclic and branch chain organosiloxanes having at least two silicon atoms and an unsaturated aliphatic group attached by a carbon chain of at least two carbon atoms to the silicon atom, for example:

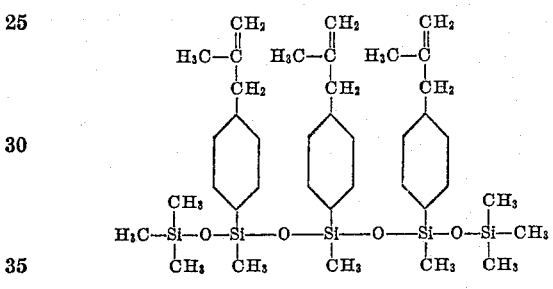

End blocked p-methylallylphenylmethylsiloxane

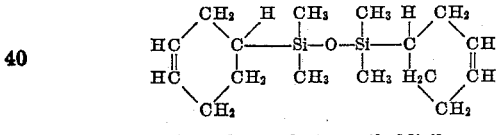

Bis(cyclohexenyltetramethyldisiloxane)

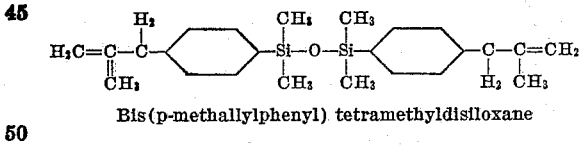

Bis(p-methallylphenyl) tetramethyldisiloxane

Suitable peracids and peroxides which may be used in the process described above include perbenzoic acid, peracetic acid and hydrogen peroxide.

To indicate more fully the advantages and capabilities of the process just described, the following specific example is set forth to illustrate the process.

*Example II*

One mol of bis(p-methylallylphenyl) tetramethyldisiloxane was added slowly to one mol of perbenzoic acid. The reaction is exothermic and the temperature is maintained between −20° C. and +20° C. The reaction is allowed to continue with agitation until all of the peracid has reacted. The reaction may be tested for completion by dropping a few drops of the reaction product into potassium iodide-sulfuric acid solution. If the reaction product contains unreacted peracid it will oxidize the potassium iodide to form free iodine which turns the solution a dark blue-green. The reaction should be continued until all the peracid has been reacted.

The product thus produced had a structural formula:

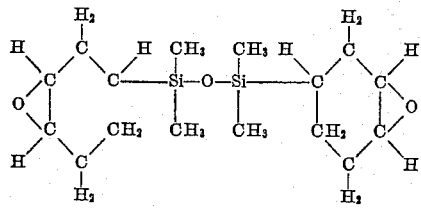

Similar epoxy siloxanes are obtained by substituting one mol of per acetic acid or one mol of hydrogen peroxide for the one mol of perbenzoic acid employed in Example II.

Equally satisfactory results also are obtainable by substituting one mol of either bis(cyclohexenyl)tetramethyldisiloxane or one mol of end-blocked p-methylallylphenylmethylsiloxane for the one mol of bis(p-methylallylphenyl)-tetramethyldisiloxane employed in Example II.

*Example III*

95 parts by weight of the epoxy-substituted organosilicone resin of Example I was admixed with 5 parts by weight of ethylene diamine. The admixture cured to a hard solid resin by heating at a temperature of 125° C. for approximately 10 hours.

Equally satisfactory cured resins may be achieved by admixing from 1 to 10 parts ethylene diamine with from 99 to 90 parts of the epoxy-substituted organosilicone resin of Example I, and heating for 10 hours at 125° C.

Equally satisfactory cured resins also may be obtained by substituting in Example III, 99 to 90 parts of the epoxy substituted organosilicone resin of Example II for the resin of Example I.

The catalyzed epoxy containing organopolysiloxanes of the present invention may be employed for potting, coating and encapsulating electrical conductors.

Referring to the drawing, there is illustrated an electrical transformer 10 comprised of a steel core 12, copper windings 14 disposed about said core 12, and resinous insulation 16. The resinous insulation 16 comprises the heat hardened epoxy-substituted organosilicone resin of this invention. It will be understood that the coating 16 may be applied by any suitable means, such as dipping, brushing or the like. It will be further understood that while core 12 and windings 14 have been described as being steel and copper respectively, they may be comprised of any suitable metals known in the art.

Since certain changes in carrying out the above processes and in the product embodying the invention may be made without departing from its scope, it is intended that the accompanying description and drawing be interpreted as illustrative and not limiting.

I claim as my invention:

A process for preparing an epoxy-substituted organosilicone compound comprising admixing and reacting at a temperature in the range of 175° C. to 200° C., one mol of an organosiloxane with from one to two mols of at least one dialkali metal salt of a compound having at least two phenolic groups, said organosiloxane being selected from the group consisting of straight, cyclic, and branched chain organosiloxanes having at least two silicon atoms with at least one carbon atom attached directly to each silicon atom and at least one chloromethyl group attached directly to a silicon atom by a carbon to silicon bond, said dialkali metal salt being selected from the group consisting of the disodium salt of bis(4-hydroxyphenyl) dimethylmethane; the dipotassium salt of bis(4-hydroxyphenyl) dimethylmethane; 4,4'-dihydroxy-diphenyl; 3,3'-dihydroxy-diphenyl; and 2,2'-dihydroxy-diphenyl, cooling the reaction product to approximately 70° C.–90° C., adding at least two mols of an epihalohydrin, and reacting the resultant mixture for from eight to twelve hours at a temperature of from 70° C. to 140° C., and recovering the epoxy-substituted organosilicone compound thus prepared.

References Cited in the file of this patent

UNITED STATES PATENTS

| | | |
|---|---|---|
| 2,730,532 | Martin | Jan. 10, 1956 |
| 2,883,397 | Bailey | Apr. 21, 1959 |

OTHER REFERENCES

New Products Information, Bulletin No. Q–2–101, New Products Dept., Dow Corning Corp., December 1957, Midland, Mich., pages 1–7.

Doklady Akad. Nauk (USSR), vol. 118, No. 4; received May 1, 1958, pages 723–726.